United States Patent [19]

Stewart

[11] Patent Number: 5,496,088
[45] Date of Patent: Mar. 5, 1996

[54] QUICK RELEASE PEDESTAL SEAT

[76] Inventor: David A. Stewart, 22322 County Rd. 4 East, Elkhart, Ind. 46514

[21] Appl. No.: 134,417

[22] Filed: Oct. 8, 1993

[51] Int. Cl.[6] .................................................. B60N 2/00
[52] U.S. Cl. ........................ 296/65.1; 248/503.1; 297/336
[58] Field of Search ............................... 296/63, 65.1, 66; 297/316, 325, 329, 331, 336, 216.15, 335; 248/503.1

[56] References Cited

U.S. PATENT DOCUMENTS

| | | |
|---|---|---|
| 1,987,331 | 1/1935 | Floraday . |
| 2,534,386 | 12/1950 | Stewart . |
| 3,915,493 | 10/1975 | Brown . |
| 3,961,767 | 6/1976 | Albrecht et al. . |
| 3,991,968 | 11/1976 | Yazejian . |
| 4,114,947 | 9/1978 | Nelson . |
| 4,168,050 | 9/1979 | Nerem et al. . |
| 4,395,011 | 7/1983 | Torta . |
| 4,593,875 | 6/1986 | Hill . |
| 4,638,546 | 1/1987 | Benshoof ............................ 296/63 X |
| 4,667,917 | 5/1987 | Takacc . |
| 4,754,943 | 7/1988 | Froutzis . |
| 4,759,580 | 7/1988 | Berklich, Jr. et al. . |
| 4,789,126 | 12/1988 | Rice et al. . |
| 4,805,952 | 2/1989 | Coleman . |
| 4,834,452 | 5/1989 | Goodrich . |
| 4,865,377 | 9/1989 | Musser et al. . |
| 4,978,097 | 12/1990 | Froutzis ............................ 248/503.1 |
| 4,978,158 | 12/1990 | Kubo et al. ............................ 296/65.1 |
| 5,125,711 | 6/1992 | Syed et al. . |
| 5,183,314 | 2/1993 | Lorbiecki .......................... 248/503.1 X |
| 5,222,712 | 6/1993 | Gregory ............................ 248/503.1 X |
| 5,230,544 | 7/1993 | Morritt et al. ...................... 297/336 X |
| 5,253,896 | 11/1993 | Verbeski . |
| 5,265,909 | 11/1993 | Verbeski . |
| 5,326,067 | 7/1994 | Gonzalez ............................ 296/65.1 X |
| 5,348,264 | 9/1994 | Few et al. ............................ 248/503.1 |

FOREIGN PATENT DOCUMENTS 83621  6/1980  Japan ................................. 248/503.1

Primary Examiner—Joseph D. Pape

[57] ABSTRACT

A removably attachable vehicle seat mechanism is provided, having a seat support connected to the vehicle seat, a base connected to the floorboard, and a base plate connected to the floorboard and base. The support is removably attachable to the base, providing for easy installation and removal of the vehicle seat from the vehicle. The vehicle seat rests substantially upright on the seat support prior to installation. The seat and seat support need be tilted at an angle of less than 20° to removably attach the support to the base. A cantilever mechanism located on the support exerts a cantilever force upon the base. A rod located on the support engages slots adjacent to rear portion of the base. Hooks located on the support engage a bar on the based, further positively locking the support to the base.

34 Claims, 2 Drawing Sheets

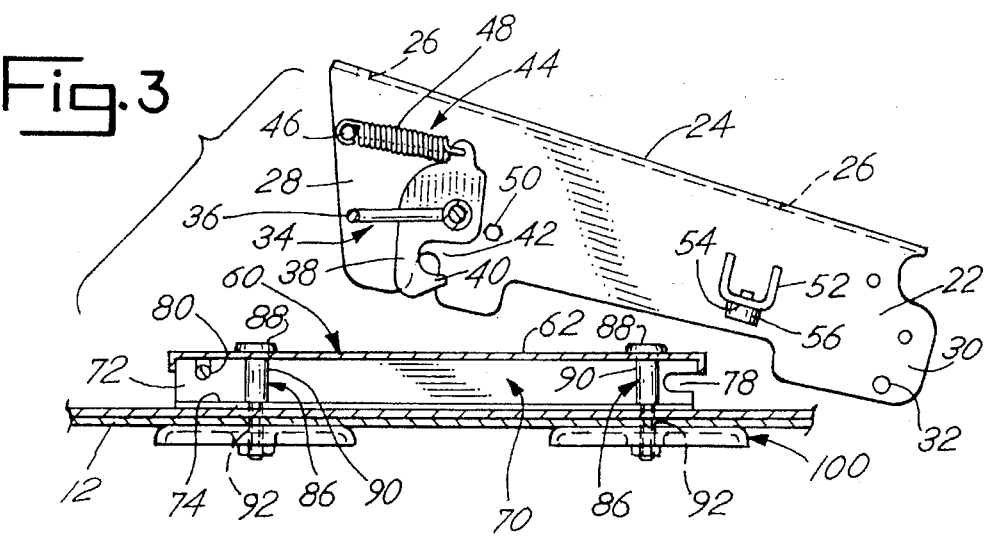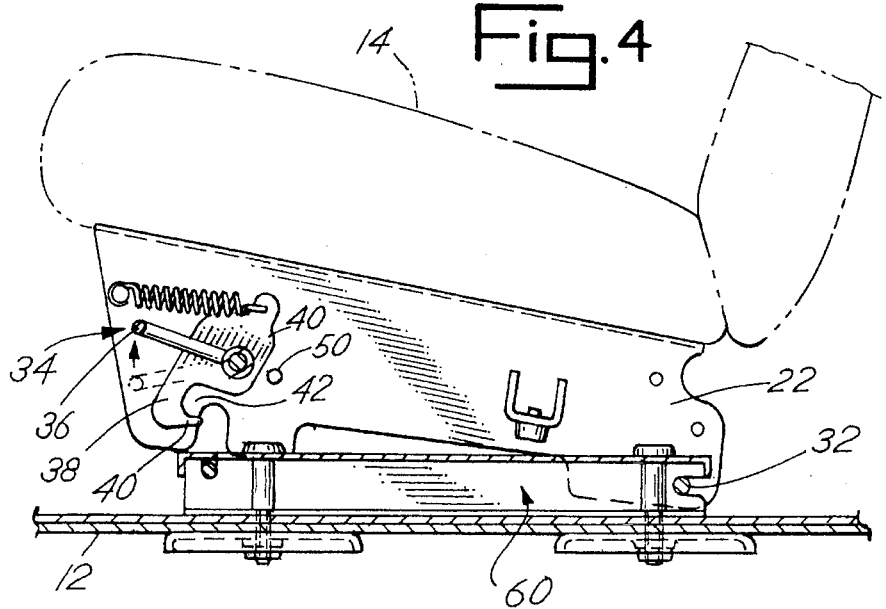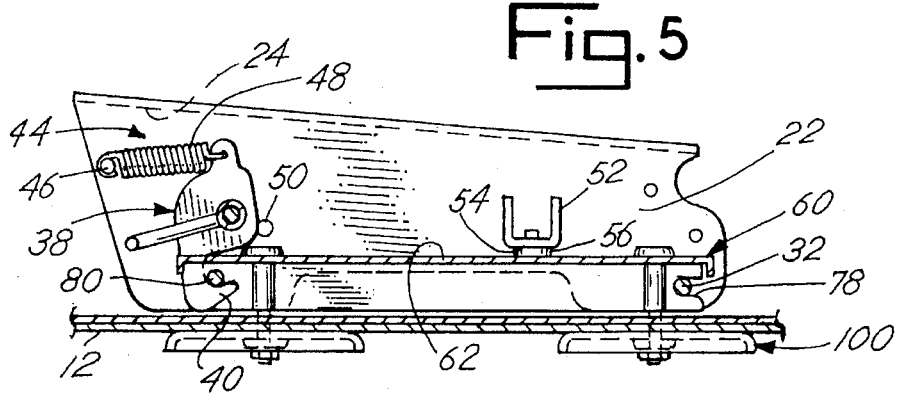

QUICK RELEASE PEDESTAL SEAT

BACKGROUND AND SUMMARY OF THE INVENTION

The present invention is related to vehicle seat assemblies. More particularly, the present invention is related to seat assemblies which allow a vehicle seat to be removably attachable to a vehicle floorboard.

The present invention is for a vehicle seat assembly which allows a vehicle seat to be removably attachable to the vehicle floorboard. When designing a vehicle seat assembly, several features are desired. For example, it is desirable to reduce the weight of the seat assembly as much as possible. Typically, the seat assembly will be made of a heavy-duty material, such as metal. This type of material may be preferred because of its strength and rigidity. However, seat assemblies made of metal often are undesirably heavy. A vehicle seat assembly which is heavy not only makes it more difficult to manipulate the seat during attachment and removal, but also adds to the overall weight of the vehicle.

Other features which are desirable in a seat assembly are strength and stability. A vehicle seat which is not stable, and which does not provide a secure seating area for the vehicle driver or passengers is not desirable. Furthermore, the seat assembly should be strong enough to support the weight of the vehicle seat as well as the passenger.

Also desirable in a seat assembly is a means for locking the seat to the floorboard. A seat assembly which allows the seat to easily become dislodged from the vehicle floorboard is undesirable.

Therefore, it is an object of the present invention to provide a seat assembly which is relatively lightweight.

Another object of the present invention is to provide a seat assembly which is easy to manipulate.

A further object of the present invention is to provide a seat assembly which is easy to attach to a vehicle floorboard, and easy to remove from the vehicle.

Yet another object of the present invention is to provide a seat assembly which is strong and stable.

A still further object of the present invention is to provide a seat assembly with a secure locking mechanism.

These and other objects of the present invention are attained by a seat assembly which allows a seat to be removably attached to a vehicle floorboard. Generally, the seat assembly of the present invention includes a seat, a support which is connected to the seat, a base which is connected to the floorboard, and a base plate which secures the base to the floorboard. The seat assembly also includes a mechanism for removably attaching the support to the base.

The base includes a generally planar top surface having a front portion, a rear portion and opposing sides, and flanges connected to the opposing sides. The flanges are substantially L-shaped, and form a channel substantially between the flange and the top surface. Included in the base are sets of vertically aligned holes. A hole located in the planar surface is substantially vertically aligned with a hole in the flange. A set of vertically aligned holes is located at each of the four corners of the base. The hole in the top surface of the base is slightly larger in diameter than its corresponding hole in the flange. This allows the base to accommodate a shoulder bolt therethrough. The head of the bolt rests against the top portion of the base and the shoulder rests against the flange, within the channel.

The base also includes a slot located in each flange, adjacent the back portion of the base. The slots allow the base to receive a portion of the support therein. The base also includes a bar positioned between the opposing flanges, adjacent the front portion of the base. The top surface has cut-outs therein, which expose a portion of the bar from above.

The support includes opposing ribs which are spaced apart and connected by a generally cylindrical rod. The rod is positioned near the rear portion of the support, and is receivable within the slots in the flanges of the base. Opposite the rod, the support includes a spring-mounted handle having hooks thereon. The handle is pivotally mounted so that it may rotate with respect to the opposing ribs. The hooks on the handle are engageable about the bar located on the base, and thus acts as a spring-loaded positive lock between the support and the base.

The support further includes at least one cantilever member thereon. The cantilever member extends generally transverse from the ribs, and is positioned so as to contact a portion of the base. The cantilever member includes a spacer, which may be a rubber cushion, to take up slack between the cantilever member and the base.

The base plate is a generally oval disk, having a peripheral flange thereabout. The base plate includes a hole therein to accept the shoulder bolt therethrough. The base plate is positioned such that its hole is vertically aligned with a set of holes in the base. The base plate is positioned substantially beneath the vehicle floorboard, such that the base plate and the base sandwich the floorboard. The shoulder bolt is inserted through the base, floorboard and base plate, and is tightened with a nut.

The seat assembly of the present invention provides for easy attachment and removal of a vehicle seat from a vehicle. The vehicle seat and support attached thereto need not be completely lifted from the vehicle floorboard to be attached to the base. The front portion of the seat and support need only be tilted at an angle of approximately 5° from the horizontal, in order to clear the base. The vehicle seat and support can then be pushed forward until the rod in the support is received within the slots in the flanges of the base. The handle on the support is then actuated, allowing the hooks to engage the bar on the base. The spring mechanism connected to the handle positively locks the support in position. In this position, the spacer on the cantilever member is pressed firmly against the top portion of the base, and exerts a cantilever force downward onto the base. This force acts as a further positive lock to prevent the hooks from disengaging the base.

Other objects, advantages, and novel features of the present invention will become apparent from the following detailed description of the invention when considered in conjunction with the accompanying drawings and the claims.

BRIEF DESCRIPTION OF THE DRAWINGS

FIG. 3 is a side view of the seating arrangement of the present invention, showing the angle and position of engagement of the support with respect to the base.

FIG. 4 is a side view of the seating arrangement of the present invention, showing the position of the support relative to the base prior to positive locking of the two components.

FIG. 5 is a side view of the seating arrangement of the present invention showing the support firmly locked to the base.

DETAILED DESCRIPTION OF THE PREFERRED EMBODIMENTS

Figure 1:
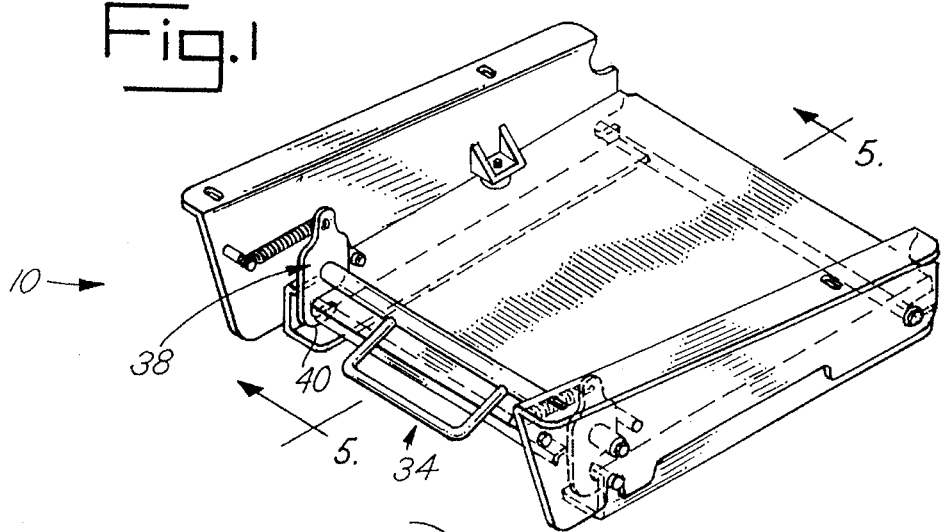
FIG. 1 shows a perspective view of the seating arrangement of the present invention.
Figure 2:
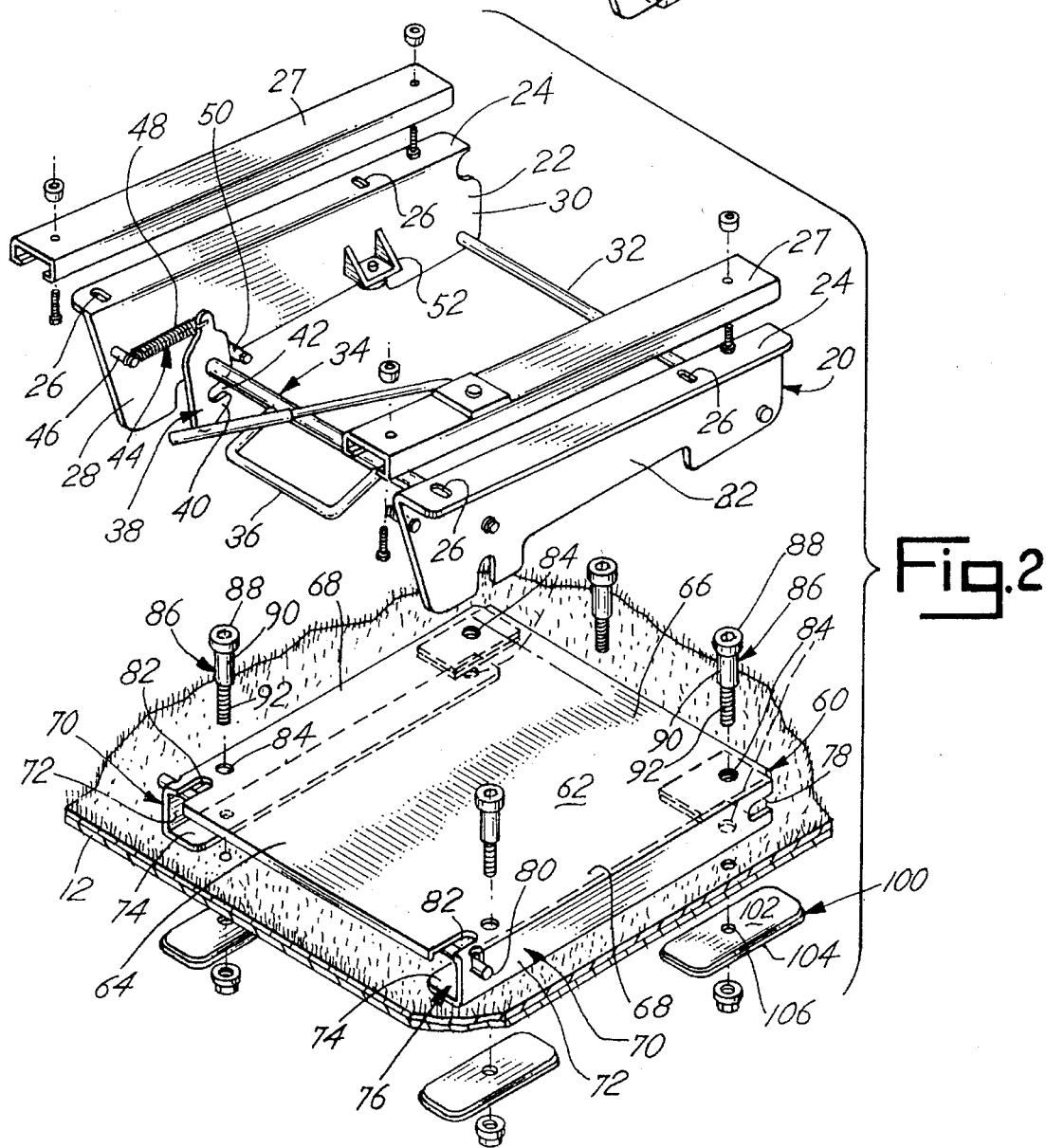
FIG. 2 shows an exploded view of the seating arrangement of the present invention.

FIG. 1 shows a seat assembly which can be used to removably attach a vehicle seat to the floorboard of a vehicle. The seat assembly of the present invention is referred to generally by the reference numeral 10, and includes 3 basic components: support 20, base 60, and at least one base plate 100. As can be seen in FIG. 2 base 60 is mounted to floorboard 12 of the vehicle, and support 20 is mounted to the underside of seat 14. Typically, floorboard 12 extends in a single plane. Base plate 100 is positioned beneath floorboard 12, and secures base 60 to the floorboard. Support 20 and base 60 are removably connectable to one another, providing for easy insertion and removal of seat 14 to and from the vehicle.

As shown in FIG. 2, support 20 comprises a pair of spaced apart, oppositely disposed ribs 22. Each rib 22 is a generally rigid, heavy-duty plate, and may be made of metal. Each rib 22 includes top rail 24. Top rail 24 extends substantially transverse from rib 22. Top rail 24 provides a substantially flat surface for mounting support 20 to the underside of seat 14. Top rail 24 includes a plurality of holes 26 therein, allowing each rib 22 to be bolted to seat 14. Support 20 may also be connected to seat 14 by other similar connectors, such as studs, screws or nails. It is also possible to connect support 20 to seat 14 by welding or other similar bonding. In one illustrative embodiment of the present invention, a slide track is positioned between top rail 24 and seat 14. The use of slide track 27 allows seat 14 to be slidably adjustable with respect to seat assembly 10.

Support 20 generally includes a front portion 28 and a rear or back portion 30. Front portion 28 of support 20 references that portion of the support which is nearest the front of the vehicle and rear portion 30 of support 20 references that portion which is nearest the rear of the vehicle.

Support 20 also contains rod 32. Rod 32 is a substantially cylindrical member constructed of a heavy-duty material, such as metal. Rod 32 is connected at opposite ends to opposing ribs 22, by a method such as welding. In the embodiments shown, rod 32 is positioned adjacent rear portion 30 of support 20, and is connected to ribs 22 substantially opposite top rail 24. Rod 32 extends substantially transverse to ribs 22.

Support 20 further includes handle 34. Handle 34 is shown as a generally cylindrical member, extending between opposite ribs 22. Handle 34 includes grip 36 thereon, which allows a user to manipulate the handle. Handle 34 is pivotally mounted to ribs 22 such that it may rotate with respect to the opposing ribs.

Attached to handle 34 is engagement means 38. Engagement means 38 provides a mechanism whereby support 20 may engage a portion of base 60. Engagement means 38 includes at least one hook 40. In the embodiments shown, two hooks 40 are used. Hooks 40 are spaced apart along handle 34, such that one hook 40 is positioned substantially adjacent opposite ends of handle 34. Hooks 40 are fixedly attached to handle 34, such that turning handle 34 causes hooks 40 to rotate. Each hook 40 includes groove 42 therein for receiving a portion of base 60.

Attached to each hook 40 is spring mechanism 44. Spring mechanism 44 biases hook 40 in a predetermined direction. Spring mechanism 44 includes standard 46 attached to rib 22, and spring 48. Spring 48 is connected at one end to standard 46, and at its opposite end to hook 40. Spring mechanism 44 biases hook 40 such that hook 40 tends to rotate in a direction substantially towards rear portion 30. Spring mechanism 44 further includes stop 50. Stop 50 is a mechanical stop member which extends substantially transverse from rib 22 and which contacts a portion of hook 40. Stop 50 prevents hook 40 from rotating towards rear portion 30, despite the bias of spring mechanism 44.

Support 20 further includes cantilever member 52. Cantilever member 52 extends from rib 22, substantially transverse to the rib. In the illustrative embodiments shown, cantilever member 52 is positioned substantially between rod 32 and handle 34. Cantilever member 52 contacts a portion of base 60 and exerts a cantilever force onto the base. Cantilever member 52 includes a substantially flat surface 54 thereon, for contacting base 60. Cantilever member 52 further includes spacer 56. Spacer 56 provides a means for taking up slack between flat surface 54 and base 60. Spacer 56 can be seen in FIG. 5. In the illustrative embodiments shown, spacer 56 is a pliable, resilient member. One such illustrative embodiment of spacer 56 is a rubber cushion. However, spacer 56 may be made of another material displaying similar qualities.

Base 60 is mounted directly to floorboard 12. In certain embodiments, carpet or other flooring may be disposed substantially between floorboard 12 and base 60. In the illustrative embodiments shown, base 60 is made of a rigid, sturdy material, such as metal. In the illustrative embodiment shown in FIG. 2, base 60 include top 62. Top 62 is a generally planar surface. As shown, top 62 is substantially rectangular in shape; however, top 62 may be made of most any geometric design. Base 60 generally includes front portion 64, rear or back portion 66, and opposite sides 68. As with support 20, front portion 64 and rear portion 66 generally reference the positioning of base 60 within the vehicle. Thus, front portion 64 is positioned nearest the front of the vehicle and rear portion 66 is positioned nearest the back of the vehicle. In this position, front portion 28 of support 20 corresponds to front portion 64 of base 60 and rear portion 30 of support 20 corresponds to rear portion 66 of base 60.

Base 60 includes opposing flanges 70. Each flanges 70 extends substantially transverse from top 62 from side 68. Flanges 70 extend substantially the entire length of top 62. Each flange 70 is substantially L-shaped in cross-section, having first leg 72 extending substantially transverse from top 62, and second leg 74 extending substantially transverse from first leg 72. The positioning of flanges 70 adjacent top surface 62 creates a channel 76 substantially between each flange 70 and top 62. Each flange 70 also includes slot 78 therein. Slot 78 is positioned adjacent rear portion 66 of base 60. Slot 78 provides a means for receivably engaging a portion of support 20.

Base 60 also includes bar 80. Bar 80 is a substantially cylindrical member made of a heavy-duty material, such as metal. Bar 80 is connected at opposite ends to opposing flanges 70. In the embodiments shown, bar 80 is welded to each flange 70. As can be seen in FIG. 2, bar 80 is connected to opposing first legs 72 of flanges 70.

Bar 80 is positioned adjacent front portion 64 of base 60. Bar 80 provides a means for receivably engaging a portion of support 20 thereabout. Adjacent bar 80, base 60 includes cut-outs 82 in top 62. Cut-outs 82 are positioned adjacent front portion 64, and are spaced apart such that each cut-out 82 is also adjacent a side 68. Cut-out 82 exposes a portion of bar 80 from above.

Base 60 includes a plurality of holes 84 therein. In the illustrative embodiments shown, base 60 includes a plurality of holes 84 in top 62, and a plurality of holes 84 formed in flange 70. As shown, holes 84 in flange 70 are located in second leg 74 of the flange. Each hole 84 in top 62 is substantially vertically aligned with a hole 84 formed in second leg 74 of flange 70, thereby forming a set or pair of substantially vertically aligned holes. Base 60 include four sets of holes 84, positioned generally adjacent the four corners of base 60. In the embodiments shown, each hole 84 in top 62 is slightly larger than its corresponding vertical hole 84 in flange 70.

Base 60 is mounted to floorboard 12 using bolt 86. Other forms of attachment, such as screws, nails or the like, or other means of bonding, such as welding, may be used to secure base 60 to floorboard 12. In the illustrative embodiments shown, bolt 86 is a shoulder bolt. Shoulder bolt 86 includes head 88, shoulder 90 and threaded portion 92. The diameter of shoulder 90 is slightly larger than the diameter of threaded portion 92. Bolt 86 is positionable through a set of holes 84 to secure base 60 to floorboard 12. In practice, bolt 86 is inserted through a set of holes 84 in a direction towards the floorboard. In position, head 88 of bolt 86 rests against top 62 of base 60, and shoulder 90 extends the approximate entire width of channel 76. Thus, the edge of shoulder 90 rests substantially against second leg 74. This is shown in FIGS. 3–5.

To provide additional support, or to decrease the width of channel 76, a plate or similar member (not shown) may be attached to the underside of top 62, adjacent hole a 84. Such a member provides additional rigidity and strength, and takes up space between top 62 and second leg 74 of flange 70.

Seat assembly 10 also includes base plate 100. Base plate 100 is a generally rigid member, made of a heavy-duty material, such as metal. Although base plate 100 may be of most any geometric shape, in the embodiments shown base plate 100 is shaped generally as an oval. Base plate 100 includes top 102, and peripheral flange 104. Peripheral flange extends from top 102 about the entire periphery of base plate 100. Flange 104 extends from top 102 at an angle of approximately 45 degrees from the vertical.

Base plate 100 also includes hole 106 therein. Base plate 100 is positionable beneath floorboard 12, such that hole 106 is vertically aligned with a set of holes 84. Bolt 86 may be positioned through base 60, floorboard 12 and hole 106 in base plate 100, and secured with a nut or similar device.

Having described the structure of seat assembly 10 of the present invention, its functions and features can be readily appreciated. Seat assembly 10 allows seat 14 to be removably attached to floorboard 12 to provide for easy installation and removal. Base 60 is secured to floorboard 12 of the vehicle. A base plate 100 is positioned beneath floorboard 12, such that hole 106 in base plate 100 is substantially vertically aligned with each set of holes 84 in base 60. A bolt 86 is then inserted through holes 84, floorboard 12 and hole 106, and secured with a nut. Each bolt 86 passes through two holes 84 in base 60. Head 88 contacts top 62, and shoulder 90 contact second leg 74 of flange 70. Thus, there is a two-point contact between each bolt 86 and base 60.

While various bolt and hole patterns may be used, the illustrative embodiments of the present invention includes a bolt hole pattern whereby holes 84 are spaced apart in a generally rectangular fashion. This provides a wide base of contact between base 60 and floorboard 12, thus providing additional strength and rigidity.

Support 20 is attached to the underside of vehicle seat 14, using bolts or a similar connector. As described earlier, a slide track or spacer may be positioned between support 20 and seat 14. Seat 14 equipped with support 20 rests evenly upright, supported by opposing ribs 22 of support 20. Thus, seat 14 remain stable and upright even prior to installation.

Support 20 is removably connected to base 60 by sliding the support 20 over the base 60, beginning at the rear and sliding towards the front of the vehicle. Seat 14 is positioned such that front portion 28 of support 20 is positioned directly behind rear portion 66 of base 60. Seat 14 and support 20 are then tilted, utilizing rear 30 of support 20 as a pivot point. Thus, only front portion 28 of support 20 need be raised from floorboard 12. Front portion 28 of support 20 need be tilted only far enough to allow hooks 40 to clear top 62 of base 60. In the illustrative embodiments shown, this angle is approximately 5 degrees from the horizontal.

After front portion 28 has been tilted, seat 14 and support 20 are pushed towards the front of the vehicle, until rod 32 of support 20 is fully received within slots 78 of flanges 70. In this position, hooks 40 rest substantially vertically above bar 80.

Support 20 is secured to base 60 by securing hooks 40 about bar 80. A user may hold grip 36 and pivot handle 34 until hooks 40 clear bar 80. Seat 14 and support 20 can then be lowered, and grip 36 released. The tension in hooks 40 provided by spring mechanism 44 causes handle 34 and hooks 40 to pivot, such that bar 80 is received within grooves 42 of hooks 40. This locks support 20 to base 60, and prevents support 20 from shifting with respect to the base.

Once handle 34 is released, and hooks 40 engage bar 80, support 20 is positively locked to base 60. Support 20 and seat 14 are prevented from advancing further forward, as rod 32 is firmly secured within slots 78 in flange 70. Seat 14 and support 20 are prevented from sliding rearwardly, because of the engagement of hooks 40 about bar 80. Additionally, cantilever member 52 also adds to the stability and locking action of seat assembly 10. In position, spacer 56 of cantilever 52 contacts top portion 62 of base 60, and exerts a downward force thereon. With rod 32 secured within slots 78 acting as an anchor point, the force supplied by cantilever member 52 onto top 62 acts as a cantilever force, and prevents support 20 from being raised or from disengaging base 60.

To remove seat 14 from the vehicle, grip 36 is used to turn handle 34. Handle 34 is turned until hooks 40 clear bar 80. Front portion 28 of support 20 can then be raised a small distance, until hooks 40 clear top 62 of base 60. When lifting front portion 28 of support 20 to disengage the support from base 60, support 20 need be tilted only approximately 5 degrees from the horizontal. Seat 14 and support 20 can then be slid rearwardly until rod 32 disengages slots 78 and flange 70. Vehicle seat 14 can then be removed from the vehicle.

Although the invention has been described in detail, the scope of the invention is to be limited only by the terms of the appended claims. For example, the relative dimensions of the various components may be modified to enable seat assembly 10 to be aligned in conjunction with seats 14 of varying dimensions, as well as different vehicles.

What is claimed is:

1. A seat assembly for use in a vehicle, said vehicle including a floor board therein, comprising:

a seat;

a support connected to said seat;

a base;

a mechanism to attach said support to said base; and wherein the base includes a top surface having a front portion, a back portion and opposing sides, the base further including flanges connected to the sides thereby forming a channel substantially between each flange and the top surface.

2. The assembly according to claim 1 wherein said support includes a pair of spaced apart ribs, a rod and a handle, said rod disposed substantially between and transverse to said ribs and connected opposite ends to said ribs, said handle connected at opposite ends to said ribs and disposed substantially transverse to said ribs, said rod being positioned adjacent said rear portion of said support and said handle being positioned adjacent said front portion of said support.

3. The assembly according claim 1 further including a base plate which is connectable to said floorboard and said base, said base support being positioned adjacent said floorboard opposite said base.

4. The assembly according claim 1 wherein said support includes at least one cantilever mechanism for exerting a cantilever force onto said base.

5. A seat assembly for use in a vehicle, said vehicle including a floorboard therein, comprising:

a seat;

a support connected to said seat;

a base connected to said floorboard;

means for removably attaching said support to said base; and said base includes at least one set of substantially vertically aligned, spaced apart holes therein for securing said base to said floorboard.

6. The assembly according to claim 5 wherein said base includes a top surface, a front portion, a rear portion and opposing sides, said base further including flanges connected to said sides thereby forming a channel substantially between each said flange and said top surface.

7. The assembly according to claim 6 wherein each hole of said set of holes is spaced apart by said channel.

8. The assembly according to claim 7 further including a bolt positionable through each said set of holes.

9. The assembly according to claim 8 wherein said bolt includes a shoulder thereon, said shoulder being positionable substantially within said channel.

10. The assembly according to claim 6 wherein each said flange includes a slot therein adjacent said rear portion, said slot for receiving a portion of said support therein.

11. The assembly according to claim 6 including a bar positioned adjacent said front portion of said base for receiving a portion of said support thereabout.

12. The assembly according to claim 5 wherein said support is tilted at an angle of less than 20° from the horizontal during removal from and attachment of said support to said base.

13. The assembly according to claim 5 wherein said support includes a pair of spaced apart ribs, a rod and a handle, said rod being disposed substantially between and transverse to said ribs and connected at opposite ends to said ribs, said handle connected at opposite ends to said ribs and disposed substantially transverse to said ribs.

14. The assembly according to claim 5 including a base plate connectable to said floorboard and said base, said base plate being positioned substantially adjacent said floorboard, opposite said base.

15. The assembly according to claim 5 wherein said support includes a cantilever mechanism for exerting a cantilever force upon a portion of said base.

16. A seat assembly for use in a vehicle, said vehicle including a floorboard therein comprising:

a seat;

a support having a front portion and a rear portion, said support being connected to said seat;

a base connected to said floorboard;

the support including at least one rib extending substantially orthoginal from the base, and wherein at least one of the ribs includes a member thereon for exerting a force on the base, the member extending substantially orthoginally from the rib.

17. The assembly according to claim 16 wherein said cantilever member includes a spacer thereon for providing for slack between said member and said base.

18. The assembly according to claim 17 wherein said spacer is a rubber cushion.

19. The assembly according to claim 16 further including a handle for engaging a portion of said base.

20. The assembly according to claim 19 wherein said engagement means includes at least one hook.

21. The assembly according to claim 19 wherein said engagement means is spring loaded.

22. The assembly according to claim 16 wherein said support is tilted at an angle of less than 20° from the horizontal during removal from and attachment of said support to said base.

23. The assembly according to claim 16 wherein said base includes a top surface having a front portion, a rear portion and opposing sides, said base further including flanges connected to said opposing sides thereby forming a channel substantially between each said flange and said top surface.

24. The assembly according claim 16 further including a base plate connectable to said floorboard and said base, said base plate being positioned adjacent said floorboard opposite said base.

25. A seat mount assembly for mounting a vehicle seat to a vehicle floorboard, comprising a seat;

a support connected to said seat;

a base connected to said floorboard;

at least one member attached to said support, said member for exerting a force onto said base, the member extending substantially orthoginally from a portion of the support so as to be engageable with a top portion of the base.

26. The assembly according to claim 25 wherein said member includes a spacer thereon for providing for slack between said member and said base.

27. The assembly according to claim 26 wherein said spacer includes a rubber cushion.

28. The assembly according to claim 25 wherein said support is tilted at an angle of less than 20° from the horizontal during removal from and attachment of said support to said base.

29. The assembly according to claim 25 wherein said base includes a top surface having a front portion, a rear portion and opposing sides, said base further including flanges connected to said sides thereby forming a channel substantially between each said flange and said top surface.

30. The assembly according to claim 25 wherein said support includes a pair of spaced apart ribs, a rod and handle, said rod being disposed substantially between and transverse to said ribs and connected at opposite ends to said ribs, said handle connected at opposite ends to said ribs and disposed substantially transverse to said ribs.

31. The assembly according to claim 25 further including a base plate connectable to said floorboard and said base, said base plate being positioned substantially adjacent said floorboard, opposite said base.

32. A seat assembly for use in a vehicle, said vehicle including a floorboard therein, comprising:

a seat;

a support connected to said seat;

a base connected to said floorboard; and wherein the base includes a top surface having a front portion, a rear portion and opposing sides, said base further including flanges connected to the sides thereby forming a channel substantially between each said flange and said top surface.

33. The assembly according to claim 32, wherein in said support includes a pair of spaced apart, oppositely disposed ribs, a rod and a handle, said rod being disposed substantially between said ribs and transverse to said ribs and connected at opposite ends to said ribs, said handle connected at opposite ends to said ribs and disposed substantially transverse to said ribs.

34. The assembly according to claim 32 further including a cantilever mechanism attached to said support for exerting a force onto said base.

* * * * *